(12) United States Patent
Gladden

(10) Patent No.: US 6,282,899 B1
(45) Date of Patent: Sep. 4, 2001

(54) SCROLLESS COMPRESSOR HOUSING

(75) Inventor: John R. Gladden, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/666,579

(22) Filed: Sep. 21, 2000

(51) Int. Cl.[7] .................................................. F02B 33/44
(52) U.S. Cl. ........................................................ 60/612
(58) Field of Search ............................. 60/612; 417/407

(56) References Cited

U.S. PATENT DOCUMENTS

| | | | |
|---|---|---|---|
| 4,570,442 | * | 2/1986 | Deutschmann et al. ............... 60/612 |
| 4,638,634 | * | 1/1987 | McLean ................... 60/612 |
| 4,753,076 | * | 6/1988 | Deutschmann et al. ............... 60/612 |
| 4,930,315 | * | 6/1990 | Kanesaka .................. 60/612 |
| 4,955,199 | * | 9/1990 | Kawamura ............................. 60/612 |
| 5,528,902 | | 6/1996 | Hoerl et al. ............................. 60/612 |
| 5,560,207 | | 10/1996 | Ramsden et al. ....................... 60/612 |
| 5,692,378 | | 12/1997 | Ramsden ................................ 60/612 |

* cited by examiner

Primary Examiner—Thomas Denion
Assistant Examiner—Thai-Ba Trieu
(74) Attorney, Agent, or Firm—Todd T. Taylor

(57) ABSTRACT

A turbocharger for an internal combustion engine is described. Compressor wheels for first and second compression stages are disposed in box-like enclosures. Turbines, connected by shafts to the compressor wheels, are disposed outside the enclosures. Inlets in the first enclosure provide fluid to the first stage compressors, which operate to pressurize the first enclosure with the fluid. Fluid flows from the first enclosure to inlets of the second stage compressors, which operate to pressurize the second enclosure with the fluid.

25 Claims, 4 Drawing Sheets

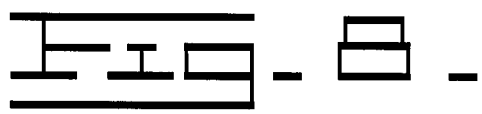
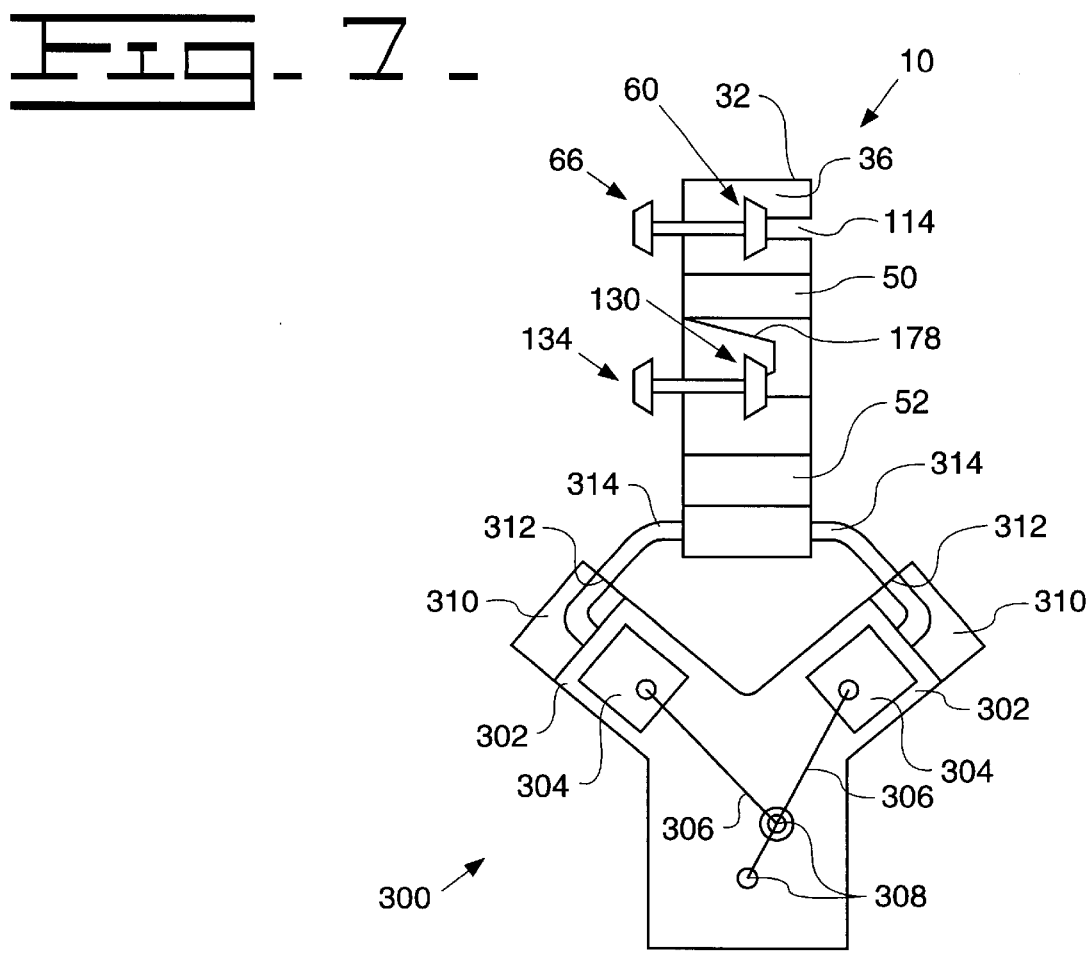
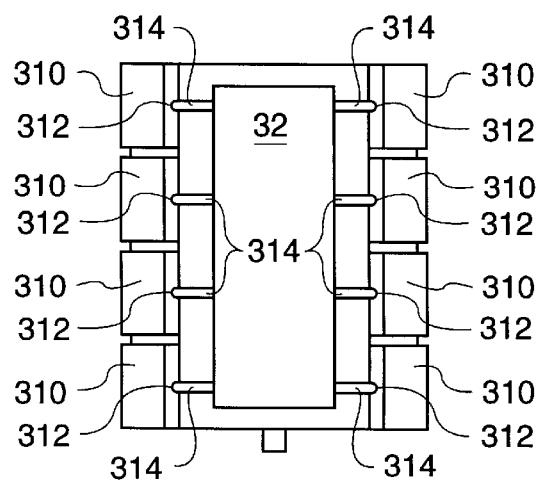

US 6,282,899 B1

SCROLLESS COMPRESSOR HOUSING

TECHNICAL FIELD

The present invention relates to turbochargers for internal combustion engines, and more particularly to housings for the compressor stages in turbocharger systems.

BACKGROUND ART

A limiting factor in the performance of an internal combustion engine is the amount of combustion air that can be delivered to the intake manifold for combustion in the engine cylinders. Atmospheric pressure is often inadequate to supply the required amount of air for proper operation of an engine.

An internal combustion engine, therefore, may include one or more turbochargers for compressing air to be supplied to one or more combustion chambers within corresponding combustion cylinders. Each turbocharger typically includes a turbine driven by exhaust gases of the engine and a compressor driven by the turbine. The compressor receives the air to be compressed and supplies the air to the combustion chamber. It is also known to use turbochargers to compress gaseous fuels, and to compress a fluid stream mixture of combustion air and fuel.

A conventional multi-stage turbocharger includes a turbine section and two or more compressor sections. A common shaft interconnects the turbine wheel of the turbine section with compressor wheels in the compressor sections. Ambient air to be used for combustion in the internal combustion engine is brought into an inlet for the first compressor section. The air is compressed by the first compressor wheel, and passes from the first compressor section through a first compressor section outlet to the inlet of the second compressor section, for further compression. An interstage duct is used to conduct the compressed air from the first compressor section outlet to the inlet of the second compressor section. The out flow from the second compressor section exits the turbocharger at the second compressor section outlet, and is directed to the inlet manifold of the internal combustion engine.

One of the problems associated with the use of turbochargers is the build up of heat in the compressed air. Heat reduction has been accomplished through the use of so called "interstage coolers" between the compressor stages of a multistage turbocharger and/or so-called "aftercoolers" between the second or last compressor outlet and the intake manifold. Known interstage coolers and aftercoolers have included external units to which the compressed air is ducted for cooling therein. Ducting to and from interstage coolers and aftercoolers can be complex and expensive to manufacture.

Another problem associated with the use of turbochargers is the complex housing or scroll which surrounds the compressor wheels, and the complex interstage duct used to connect compressors of a multi-stage turbocharger. Manufacture of these components is complex and difficult, and adds significantly to the cost of providing a turbocharger.

It is known from U.S. Pat. No. 5,528,902 to provide a support housing to which exhaust gas turbochargers are fastened. The housing encloses a hollow space which receives the turbines of the exhaust gas turbocharger, while the compressors are situated outside the hollow space. The turbines include turbine housings having spiral ducts for the flow of exhaust gases there through.

The present invention is directed to overcoming one or more of the problems set forth above.

DISCLOSURE OF THE INVENTION

In responding to the deficiencies of the prior art, the present invention provides a box-like housing defining a hollow space, a compressor wheel operatively disposed in the hollow space, and the housing defining an inlet opening associated with the compressor wheel. An outlet associated with the compressor wheel is in fluid flow communication with the hollow space.

In one aspect of the invention, a turbocharger for an internal combustion engine includes a first stage enclosure defining a first hollow space within the first stage enclosure, and a first stage first shaft. A first stage first turbine is disposed outside the enclosure, and includes a first stage first turbine wheel carried by the first stage first shaft. A first stage compressor includes a first stage first compressor wheel disposed in the first stage enclosure and carried by the first stage first shaft. A first stage first compressor inlet is defined by the enclosure and is in fluid flow communication with the area outside the first stage enclosure. A first stage first compressor outlet is associated with the first stage first compressor wheel, and is in fluid flow communication with the first hollow space. A second stage enclosure defines a second hollow space within the second stage enclosure. A second stage first shaft is provided, and a second stage first turbine disposed outside the second stage enclosure includes a second stage first turbine wheel carried by the second stage first shaft. A second stage first compressor includes a second stage first compressor wheel disposed in the second stage enclosure and carried by the second stage first shaft. A second stage first compressor inlet is defined by the second stage enclosure and associated with the second stage first compressor wheel. The second stage first compressor inlet is in fluid flow communication with the first hollow space. A second stage first compressor outlet is associated with the second stage first compressor wheel, and is in fluid flow communication with the second hollow space.

In another aspect of the invention; an internal combustion engine includes an exhaust manifold; a plurality of combustion cylinders, each having a cylinder head and an inlet port in the cylinder head. A turbocharger includes a first stage enclosure defining a first hollow space within the first stage enclosure and an area outside the first stage enclosure. The turbocharger has a first stage first shaft; a first stage first turbine disposed outside the first stage enclosure, and a first stage first turbine wheel carried by the first stage first shaft. A first stage first turbine inlet is in fluid flow communication with the exhaust manifold. A first stage compressor has a first stage first compressor wheel disposed in the first stage enclosure and carried by the first stage first shaft. A first stage first compressor inlet is defined by the first stage enclosure, is associated with the first stage first compressor wheel, and is in fluid flow communication with the area outside the first stage enclosure. A first stage first compressor outlet is associated with the first stage first compressor wheel, and is in fluid flow communication with the first hollow space. The turbocharger further includes a second stage enclosure defining a second hollow space within the second stage enclosure and an area outside the second stage enclosure. The second hollow space is in fluid flow communication with the inlet ports. The turbocharger has a second stage first shaft. A second stage first turbine is disposed outside the second stage enclosure, and has a second stage first turbine wheel carried by the second stage first shaft, and a second stage first turbine inlet in fluid flow communication with the exhaust manifold. A second stage first compressor has a second stage first compressor wheel in the second stage enclosure, a second stage first compressor inlet associated with the second stage first compressor wheel and, and a second stage first compressor outlet associated with the second stage first compressor wheel. The second stage first compressor outlet is in fluid flow communication with the second hollow space. Fluid flow means interconnects the second hollow space and the inlet ports.

In still another aspect of the invention, a method of operating a turbocharger for an internal combustion engine includes the steps of providing a box-like housing, having an inlet opening therein, and a compressor wheel disposed in the housing; operating the compressor wheel in the housing; passing a fluid through the inlet opening to the compressor wheel; compressing the fluid with the compressor wheel; and discharging the fluid from the compressing step into the housing.

BRIEF DESCRIPTION OF THE DRAWINGS

FIG. 7 is an end schematic representation of an internal combustion engine having a multi-stage turbocharger of the present invention; and FIG. 8 is a top view of the engine shown in FIG. 7.

BEST MODE FOR CARRYING OUT THE INVENTION

Figure 1:
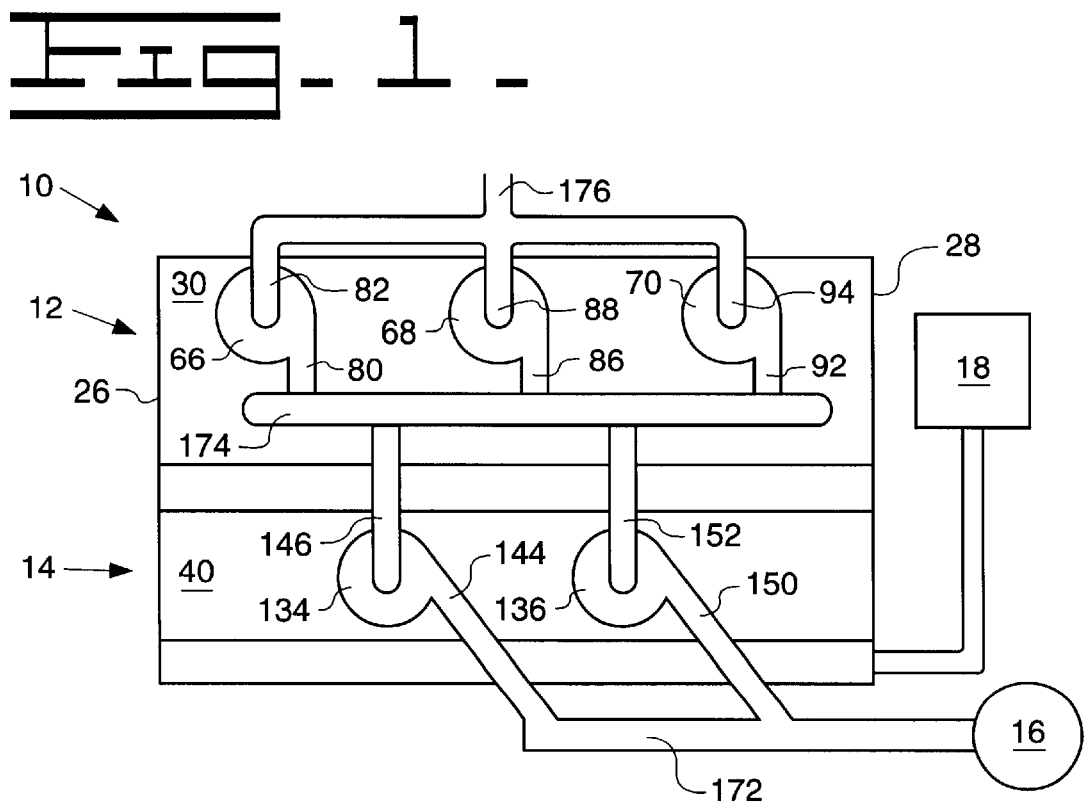
FIG. 1 is a side elevational schematic representation of a multi-stage turbocharger having a compressor housing according to the present invention.

Referring now to the drawings, and more particularly to FIG. 1, numeral 10 designates a turbocharger system having a first stage compressor section 12 and a second stage compressor section 14 which utilize scrolless compressor housings according to the present invention. Turbocharger system 10 is shown connected to an exhaust manifold 16 and to an intake manifold 18 of an internal combustion engine.

Turbocharger system 10 includes a box like housing 20 including a plurality of walls and dividers shown schematically as single lines in FIGS. 1 through 5. Thus, as can be seen most clearly in FIG. 2, housing 20 includes a turbine side wall 22, an inlet side wall 24 and first and second end walls 26 and 28 respectively. Within housing 20 a plurality of partitions separate the interior space of the housing into various enclosures. A first stage enclosure 30 includes upper portions of turbine side wall 22, inlet side wall 24, first end wall 26 and second end wall 28, a top 32 and a first enclosure bottom 34. First stage enclosure 30 defines therein a first hollow space 36. A second stage enclosure 40 includes lower portions of turbine side wall 22, inlet side wall 24, first end wall 26 and second end wall 28, a second enclosure top 42 and a second enclosure bottom 44. Second stage enclosure 40 defines therein a second hollow space 46.

An interstage cooler 50 is disposed between first enclosure bottom 34 and second enclosure top 42. An aftercooler 52 is disposed between second enclosure bottom 44 and a housing bottom 54. As is known to those skilled in the art, interstage cooler 50 and aftercooler 52 contain heat exchange elements (not shown), such as fined tube heat exchangers, internally cooled plates or the like. A coolant system (not shown), is provided to circulate a cooling medium to the heat exchange elements. Interstage cooler 50 may, itself, define first enclosure bottom 34 and second enclosure top 42, which need not then be separate and distinct components. Similarly, aftercooler 52 may define second enclosure bottom 44.

Figure 3:
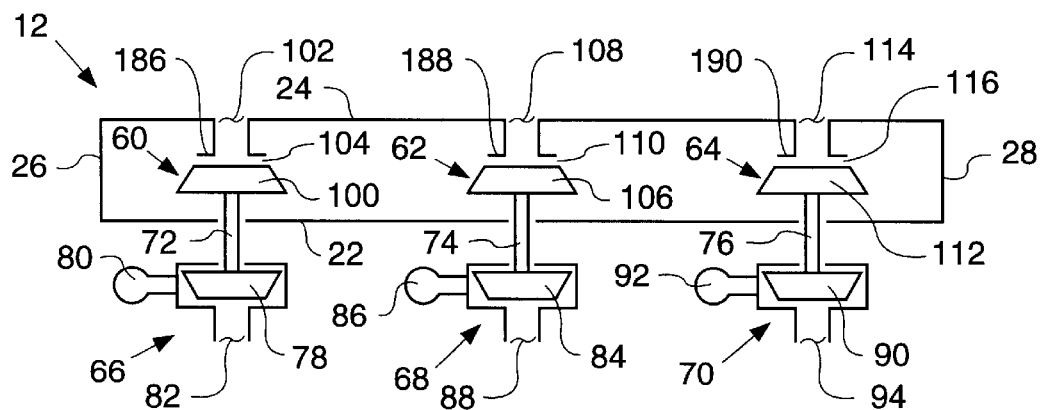
FIG. 3 is a top view-schematic representation of the upper section of the multi-stage turbocharger shown in FIG. 1.

Referring now to FIG. 3, first stage compressor section 12 includes a first stage first compressor 60, a first stage second compressor 62 and a first stage third compressor 64. Associated with first stage compressors 60, 62 and 64 are a first stage first turbine 66, a first stage second turbine 68 and a first stage third turbine 70, respectively. A first stage first shaft 72 extends between first stage first compressor 60 and first stage first turbine 66. A first stage second shaft 74 extends between first stage second compressor 62 and first stage second turbine 68. A first stage third shaft 76 extends between first stage third compressor 64 and first stage third turbine 70.

First stage first turbine 66 includes a first stage first turbine wheel 78 carried on first stage first shaft 72. A first stage first turbine inlet 80 and a first stage first turbine outlet 82 are associated with first stage first turbine wheel 78.

First stage second turbine 68 includes a first stage second turbine wheel 84 carried on first stage second shaft 74. A first stage second turbine inlet 86 and a first stage second turbine outlet 88 are associated with first stage second turbine wheel 84.

First stage third turbine 70 includes a first stage third turbine wheel 90 carried on first stage third shaft 76. A first stage third turbine inlet 92 and a first stage third turbine outlet 94 are associated with first stage third turbine wheel 90.

First stage first compressor 60 includes a first stage first compressor wheel 100 carried on first stage first shaft 72. A first stage first compressor inlet 102 and a first stage first compressor outlet 104 are associated with first stage first compressor wheel 100.

First stage second compressor 62 includes a first stage second compressor wheel 106 carried on first stage second shaft 74. A first stage second compressor inlet 108 and a first stage second compressor outlet 110 are associated with first stage second compressor wheel 106.

First stage third compressor 64 includes a first stage third compressor wheel 112 carried on first stage third shaft 76. A first stage third compressor inlet 114 and a first stage third compressor outlet 116 are associated with first stage third compressor wheel 112.

First stage first compressor inlet 102, first stage second compressor inlet 108 and first stage third compressor inlet 114 are formed in inlet side wall 24 of housing 20 and communicate with a region outside of first stage enclosure 30. First stage inlets 102, 108 and 114 provide fluid flow communication between the region outside first stage enclosure 30 and first stage compressor wheels 100, 106 and 112, respectively, whereby, an ambient fluid is provided to the first stage compressors 60, 62 and 64.

First stage compressor wheels 100, 106 and 112 are disposed within first stage enclosure 30, in first hollow space 36. First stage compressor outlets 104, 110 and 116 communicate directly with first hollow space 36 in first enclosure 30.

Figure 4:
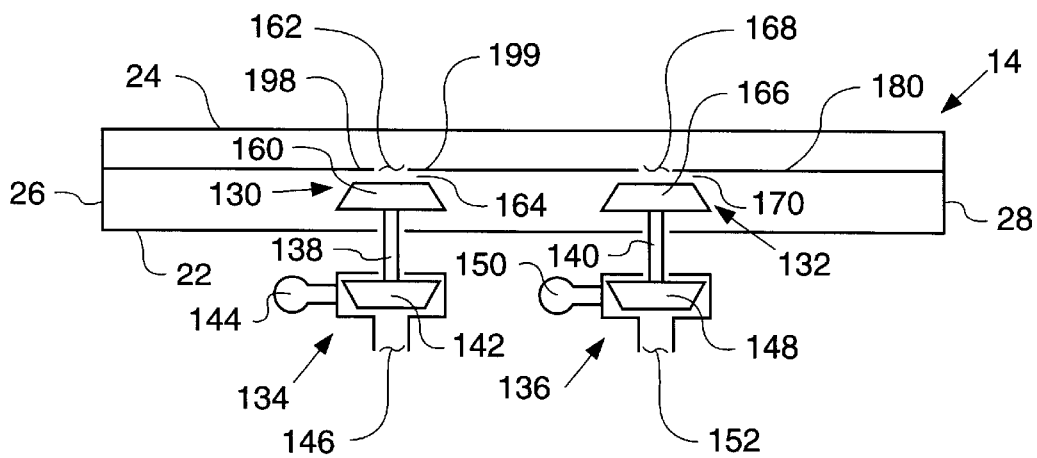
FIG. 4 is a top view schematic representation of the lower section of the multi-stage turbocharger shown in FIG. 1.

Referring now to FIG. 4, second stage compressor section 14 includes a second stage first compressor 130 and a second stage second compressor 132. Associated with second stage compressors 130 and 132 are a second stage first turbine 134 and a second stage second turbine 136, respectively. A second stage first shaft 138 extends between second stage first compressor 130 and second stage first turbine 134. A second stage second shaft 140 extends between second stage second compressor 132 and second stage second turbine 136.

Second stage first turbine 134 includes a second stage first turbine wheel 142 carried on second stage first shaft 138. A second stage first turbine inlet 144 and a second stage first turbine outlet 146 are associated with second stage first turbine wheel 142.

Second stage second turbine 136 includes a second stage second turbine wheel 148 carried on second stage second shaft 140. A second stage second turbine inlet 150 and a second stage second turbine outlet 152 are associated with second stage second turbine wheel 148.

Second stage first compressor 130 includes a second stage first compressor wheel 160 carried on second stage first shaft 138. A second stage first compressor inlet 162 and a second stage first compressor outlet 164 are associated with second stage first compressor wheel 160.

Second stage second compressor 132 includes a second stage second compressor wheel 166 carried on second stage second shaft 140. A second stage second compressor inlet 168 and a second stage second compressor outlet 170 are associated with second stage second compressor wheel 166.

Referring again to FIG. 1, first stage turbines 66, 68 and 70 and second stage turbines 134 and 136 are connected in series. A second stage header 172 establishes fluid flow communication between exhaust manifold 16 and second stage turbine inlets 144 and 150. Second stage turbine outlets 146 and 152 communicate with a first stage header 174 connected to first stage turbine inlets 80, 86 and 92. First stage turbine outlets 82, 88 and 94 are connected to an exhaust system 176 for the internal combustion engine.

Second stage compressor wheels 160 and 166 are disposed in second hollow space 46 within second enclosure 40. Partitions 178 and 180 define an inlet zone 182 in second hollow space 46. Second stage compressor inlets 162 and 168 communicate with inlet zone 182.

Figure 2:
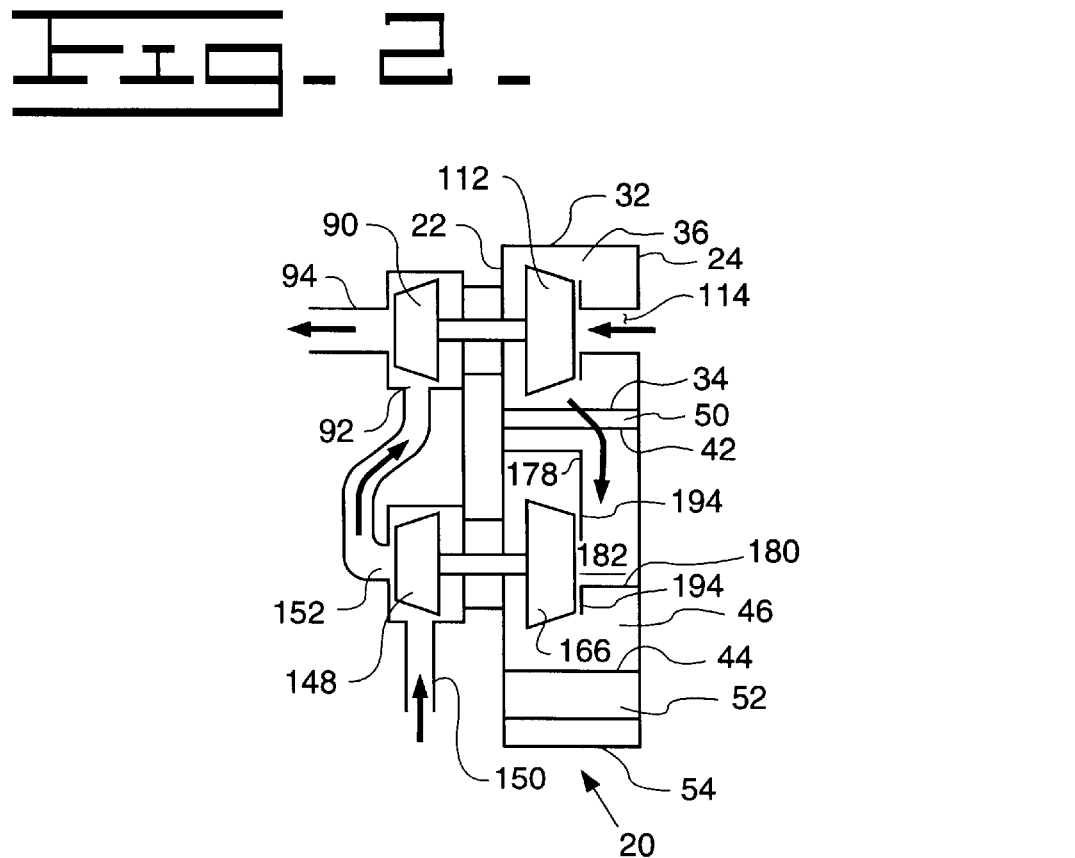
FIG. 2 is an end elevational schematic representation of the multi-stage turbocharger shown in FIG. 1.
Figure 5:
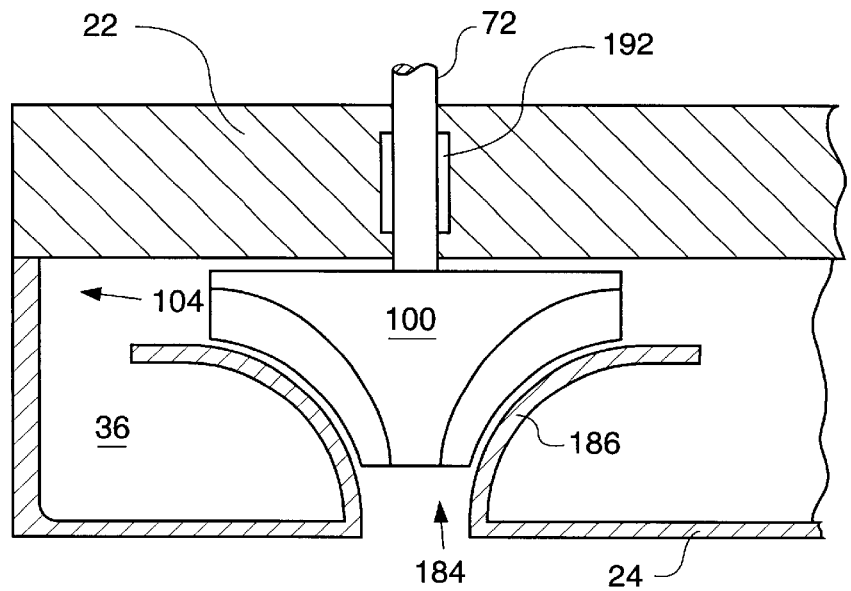
FIG. 5 is an enlarged, fragmentary cross-sectional view of a compressor wheel and inlet for the present invention.

FIG. 5 illustrates in greater detail first stage first compressor 60. Inlet side wall 24 defines an opening 184 and includes a shroud 186 which operates with first stage first compressor wheel 100 in pumping air through outlet 104 to first hollow space 36. Similar shrouds 188 and 190 are provided at first stage compressor inlets 108 and 114, respectively. Bearings 192 are provided for first stage first shaft 72 in turbine side wall 22. Partitions 178 and 180 form a shroud 194 for second stage compressor wheel 166, as shown in FIG. 2. A similar shroud, not shown, is provided for second stage compressor wheel 160.

Figure 6:
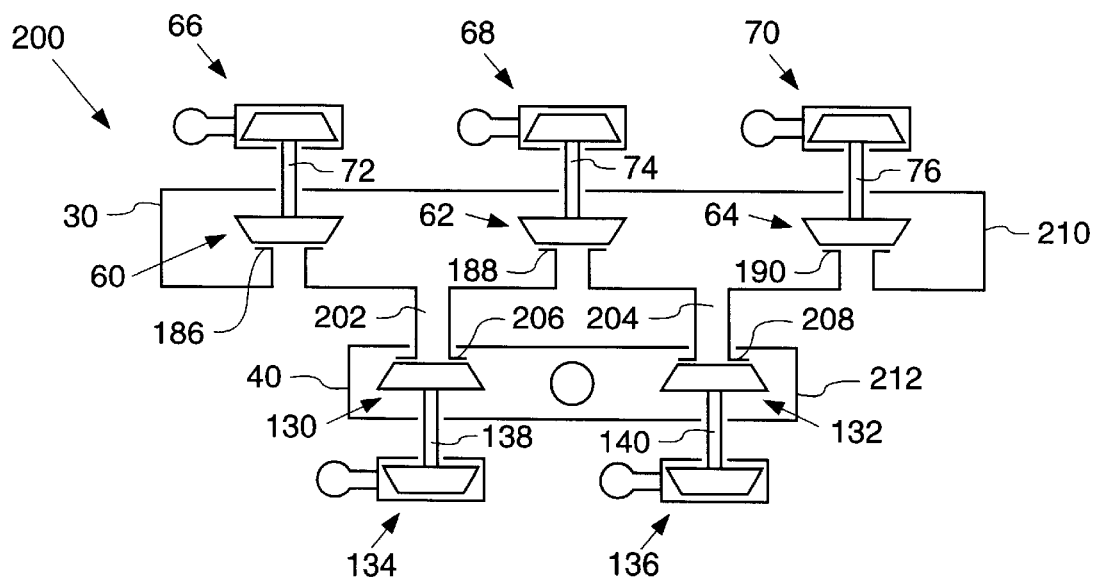
FIG. 6 is a top view schematic representation of a modified form of the present invention.

In the embodiment thus far described, first stage and second stage turbines are disposed on the same side of turbocharger system 10. In FIG. 6, an alternate arrangement 200 is shown in which inlet ducts 202 and 204 are provided for second stage compressors 130 and 132 respectively. Ducts 202 and 204 provide fluid flow communication between first hollow space 36 and second stage compressor inlets 162 and 166. Shrouds 206 and 208 are provided at the ends of ducts 202 and 204 adjacent second stage compressor wheels 160 and 170, respectively. Shrouds 206 and 208 are similar in construction, orientation and operation to shroud 186. First stage enclosure 30 and second stage enclosure 40 are defined by separate housings 210 and 212, respectively.

The installation of turbocharger system 10 on an engine 300 is shown in FIGS. 7 and 8. Combustion cylinders 302 are arranged in a generally V-shaped configuration, and each has a piston 304 operatively disposed therein. Each piston 304 is connected by a piston rod 306 to a driven member 308. Each combustion cylinder 302 includes a cylinder head 310, eight such cylinder heads 310 being shown in FIG. 8 for eight combustion cylinders 302. The eight combustion cylinders 302 and eight cylinder heads 310 are arranged in two angular banks defining the V-shaped configuration. Each cylinder head 310 has an inlet port 312 through which combustion gas in the nature of combustion air, fuel or a mixture thereof can enter cylinder heads 310, to be supplied to each respective combustion cylinder 302 associated with each cylinder head 310.

Turbocharger system 10 is generally positioned between the cylinder banks, above cylinder heads 310. Turbocharger system 10 supplies combustion fluid to each combustion cylinder 302, without the use of an intake manifold 18. Intake runners 314 are provided from second stage enclosure 40 to each cylinder head 310 at inlet port 312 thereof. When an aftercooler 52 is provided, intake runners 314 are positioned in communication with second stage enclosure 40 to receive fluid flow having passed through aftercooler 52.

INDUSTRIAL APPLICABILITY

In use, a stream of exhaust gases from exhaust manifold 16 flows through second stage header 172 to second stage turbines 134 and 136. In known manner, the stream of exhaust gases flowing through second stage turbines 134 and 136 rotates second stage turbine wheels 142 and 148, driving first and second stage shafts 138 and 140 respectively. The exhaust gas stream from second stage turbines 134 and 136 flows through second stage turbine outlets 146 and 152 to first stage header 174. In similar manner, the exhaust gas stream powers first stage turbines 66, 68 and 70, thereby rotating first stage shafts 72, 74 and 76. As will be readily understood by those knowledgeable in the art, first stage compressor wheels 100, 106 and 112 and second stage compressor wheels 160 and 166 are thereby powered by the exhaust gas stream from exhaust manifold 16, via first stage turbines 66, 68 and 70 and second stage turbines 134 and 136.

Fluid, such as air, gaseous fuel, a mixture of air and gaseous fuel, or the like, enters first compressor section 12 through first stage inlets 102, 108 and 114. Fluid entering first stage compressor section 12 is compressed by first stage compressor wheels 100, 106 and 112 and flows into first hollow space 36. Operation of each of first stage compressors 60, 62 and 64 contributes to the pressurization of first hollow space 36.

Pressurized fluid in first hollow space 36 flows through openings, not shown, and enters interstage cooler 50, where heat from the compressed fluid is transferred to a coolant fluid. From interstage cooler 50, the compressed fluid flows through openings (not shown)in second enclosure top 42, and enters inlet zone 182 of second stage enclosure 40. The fluid is directed by partitions 178 and 180 to enter second stage compressors 130 and 132, through second stage compressor inlets 162 and 168. Additional compression of the fluid occurs through functioning of second stage compressor wheels 160 and 166, and the further compressed fluid is discharged from second stage outlets 164 and 170 into second hollow space 46. Each of second stage compressors 130 and 132 contributes to the pressurization of second hollow space 46.

From second hollow space 46, the compressed fluid may enter aftercooler 52 through openings (not shown). From aftercooler 52 the cooled, compressed fluid is supplied to intake manifold 18 (FIG. 1), or through intake runners 314 directly into cylinder heads 310 (FIGS. 7 & 8).

By operatively positioning compressor wheels in a box-like enclosure, the present invention reduces complex manufacturing required for compressor scrolls. Simple geometric structures and arrangements are provided eliminating the need for complex interstage ducts between compressor stages. Interstage coolers and aftercoolers can be provided within the simple geometric arrangement, without the need for complex, piping or ducting to and from the interstage cooler or aftercooler. Costs can be reduced through the use of standardized components within the simplified structural arrangement.

Other aspects, objects and advantages of this invention can be obtained from a study of the drawings, the disclosure and the appended claims.

What is claimed is:

1. A turbocharger for an internal combustion engine, comprising:

a first stage enclosure defining a first hollow space within said first stage enclosure and an area outside said first stage enclosure;

a first stage first shaft;

a first stage first turbine disposed outside said first stage enclosure, including a first stage first turbine wheel carried by said first stage first shaft;

a first stage first compressor including:

a first stage first compressor wheel disposed in said first stage enclosure and carried by said first stage first shaft;

a first stage first compressor inlet defined by said first stage enclosure and associated with said first stage first compressor wheel, said first stage first compressor inlet being in fluid flow communication with said area outside said first stage enclosure; and a first stage first compressor outlet associated with said first stage first compressor wheel, said first stage first compressor outlet being in fluid flow communication with said first hollow space;

a second stage enclosure defining a second hollow space within said second stage enclosure and an area outside said second stage enclosure;

a second stage first shaft;

a second stage first turbine disposed outside said second stage enclosure, including a second stage first turbine wheel carried by said second stage first shaft; and a second stage first compressor including:

a second stage first compressor wheel disposed in said second stage enclosure and carried by said second stage first shaft;

a second stage first compressor inlet defined by said second stage enclosure and associated with said second stage first compressor wheel, said second stage first compressor inlet being in fluid flow communication with said first hollow space; and a second stage first compressor outlet associated with said second stage first compressor wheel, said second stage first compressor outlet being in fluid flow communication with said second hollow space.

2. The turbocharger of claim 1, including:

a first stage second shaft;

a first stage second turbine disposed outside said first stage enclosure and having a first stage second turbine wheel carried by said first stage second shaft;

a first stage second compressor having:

a first stage second compressor wheel disposed in said first stage enclosure and carried by said first stage second shaft, a first stage second compressor inlet defined by said first stage enclosure and associated with said first stage second compressor wheel, said first stage second compressor inlet being in fluid flow communication with said area outside said first stage enclosure; and a first stage second compressor outlet associated with said first stage second compressor wheel, said first stage second compressor outlet being in fluid flow communication with said first hollow space.

3. The turbocharger of claim 2, including a housing defining therein said first stage enclosure and said second stage enclosure.

4. The turbocharger of claim 2, including an interstage cooler disposed in fluid flow communication in series between said first hollow space and said second stage first compressor inlet.

5. The turbocharger of claim 4, including a single housing defining therein said first stage enclosure, said interstage cooler and said second stage enclosure.

6. The turbocharger of claim 1, including:

a second stage second shaft;

a second stage second turbine disposed outside said second stage enclosure, and including a second stage second turbine wheel carried by said second stage second shaft;

a second stage second compressor wheel disposed in said second stage enclosure and carried by said second stage second shaft;

a second stage second compressor inlet defined by said second stage enclosure and associated with said second stage second compressor wheel, said second stage second compressor inlet being in fluid flow communication with said first hollow space; and a second stage second compressor outlet associated with said second stage second compressor wheel, said second stage second compressor outlet being in fluid flow communication with said second hollow space.

7. The turbocharger of claim 6, including a single housing defining therein said first stage enclosure and said second stage enclosure.

8. The turbocharger of claim 6, including an interstage cooler disposed in fluid flow communication in series between said first hollow space and said second stage first and second compressor inlets.

9. The turbocharger of claim 8, including a single housing defining therein said first stage enclosure, said interstage cooler and said second stage enclosure.

10. The turbocharger of claim 1, including:

a first stage second shaft;

a first stage second turbine disposed outside said first stage enclosure having a first stage second turbine wheel carried by said first stage second shaft;

a first stage second compressor having:

a first stage second compressor wheel disposed in said first stage enclosure and carried by said first stage second shaft;

a first stage second compressor inlet defined by said first stage enclosure and associated with said first stage second compressor wheel, said first stage second compressor inlet being in fluid flow communication with said area outside said first enclosure; and a first stage second compressor outlet associated with said first stage second compressor wheel, said first stage second compressor outlet being in fluid flow communication with said first hollow space;

a second stage second shaft;

a second stage second turbine disposed outside said second stage enclosure, and including a second stage second turbine wheel carried by said second stage second shaft;

a second stage second compressor wheel disposed in said second stage enclosure and carried by said second stage second shaft;

a second stage second compressor inlet defined by said second stage enclosure and associated with said second stage second compressor wheel, said second stage second compressor inlet being in fluid flow communication with said first hollow space; and a second stage second compressor outlet associated with said second stage second compressor wheel, said second stage second compressor outlet being in fluid flow communication with said second hollow space.

11. The turbocharger of claim 10, including a single housing defining therein said first stage enclosure and said second stage enclosure.

12. The turbocharger of claim 10, including an interstage cooler disposed in fluid flow communication in series between said first hollow space and said second stage first and second compressor inlets, and an aftercooler disposed in fluid flow communication with said second hollow space.

13. The turbocharger of claim 12, including a single housing defining therein said first stage enclosure, said interstage cooler, said second stage enclosure and said aftercooler.

14. The turbocharger of claim 1, including an interstage cooler disposed in fluid flow communication in series between said first hollow space and said second stage first compressor inlet.

15. The turbocharger of claim 1, including an aftercooler disposed in fluid flow communication with said second hollow space.

16. The turbocharger of claim 1, including a single housing defining therein said first stage enclosure and said second stage enclosure.

17. The turbocharger of claim 16 wherein said housing includes a first side wall and a second side wall, said first stage first compressor and said second stage first compressor are disposed between said first side wall and said second side wall, said first stage first shaft and said second stage first shaft extend through said first side wall, and said first stage first compressor inlet is defined by said second side wall.

18. The turbocharger of claim 1, including a first housing defining therein said first stage enclosure and a second housing defining therein said second stage enclosure.

19. The turbocharger of claim 1 including a housing defining said first hollow space and said second hollow space, said housing having a first wall and a second wall, said first stage first turbine and said second stage first turbine being adjacent said first wall, and said second wall defining said first stage first inlet.

20. An internal combustion engine, comprising:

an exhaust manifold;

a plurality of combustion cylinders, each said combustion cylinder having a cylinder head and an inlet port in said cylinder head;

a turbocharger, including:

a first stage enclosure defining a first hollow space within said first stage enclosure and an area outside said first stage enclosure;

a first stage first shaft;

a first stage first turbine disposed outside said first stage enclosure, and having a first stage first turbine wheel carried by said first stage first shaft and a first stage first turbine inlet in fluid flow communication with said exhaust manifold;

a first stage compressor having:

a first stage first compressor wheel disposed in said first stage enclosure and carried by said first stage first shaft;

a first stage first compressor inlet defined by said first stage enclosure and associated with said first stage first compressor wheel, said first stage first compressor inlet being in fluid flow communication with said area outside said first stage enclosure; and a first stage first compressor outlet associated with said first stage first compressor wheel, said first stage first compressor outlet being in fluid flow communication with said first hollow space;

a second stage enclosure defining a second hollow space within said second stage enclosure and an area outside said second stage enclosure, said second hollow space being in fluid flow communication with said inlet ports;

a second stage first shaft;

a second stage first turbine disposed outside said second stage enclosure, and having a second stage first turbine wheel carried by said second stage first shaft, and a second stage first turbine inlet in fluid flow communication with said exhaust manifold; and a second stage first compressor having:

a second stage first compressor wheel disposed in said second stage enclosure, a second stage first compressor inlet associated with said second stage first compressor wheel and in fluid flow communication with said first hollow space, and a second stage first compressor outlet associated with said second stage first compressor wheel, said second stage first compressor outlet being in fluid flow communication with said second hollow space;

fluid flow means interconnecting said second hollow space and said inlet ports.

21. The internal combustion engine of claim 20, including a housing defining said first hollow space and said second hollow space, said housing having a first wall and a second wall disposed in spaced relation to each other, said first stage first turbine and said second stage first turbine being adjacent said first wall, said first stage first compressor and said second stage first compressor being disposed between said first wall and said second wall, and said second wall defining said first stage first compressor inlet.

22. The internal combustion engine of claim 21, including an interstage cooler disposed in fluid flow communication, in series between said first hollow space and said second stage first compressor inlet.

23. The internal combustion engine of claim 22, including an aftercooler disposed in said housing and adapted to be in flow communication in series between said second hollow space and said inlet ports.

24. The internal combustion engine of claim 20, said fluid flow means including an intake manifold.

25. The internal combustion engine of claim 20, said fluid flow means including an intake runner from said second enclosure to each said inlet port.

* * * * *